(12) United States Patent
Toyama (10) Patent No.: US 11,193,841 B2
(45) Date of Patent: Dec. 7, 2021

(54) SENSOR FOR SMOOTH ASSEMBLY

(71) Applicant: JTEKT CORPORATION, Osaka (JP)

(72) Inventor: Yuichi Toyama, Owariasahi (JP)

(73) Assignee: JTEKT CORPORATION, Osaka (JP)

( * ) Notice: Subject to any disclaimer, the term of this patent is extended or adjusted under 35 U.S.C. 154(b) by 31 days.

(21) Appl. No.: 16/728,006

(22) Filed: Dec. 27, 2019

(65) Prior Publication Data
US 2020/0217732 A1   Jul. 9, 2020

(30) Foreign Application Priority Data

Jan. 9, 2019 (JP) .............................. JP2019-001845

(51) Int. Cl.
| | |
|---|---|
| *G01L 5/22* | (2006.01) |
| *B62D 15/02* | (2006.01) |
| *G01D 5/20* | (2006.01) |

(52) U.S. Cl.
CPC ............ *G01L 5/221* (2013.01); *B62D 15/021* (2013.01); *G01D 5/2013* (2013.01)

(58) Field of Classification Search
CPC .... G01L 5/221; B62D 15/021; G01D 5/2013; F16H 3/093; F16H 3/006
USPC .................................................. 73/862.321
See application file for complete search history.

(56) References Cited

U.S. PATENT DOCUMENTS

| | | | | |
|---|---|---|---|---|
| 5,729,100 A | * | 3/1998 | Rothstein ............. | G05B 19/404 318/48 |
| 5,930,905 A | | 8/1999 | Zabler et al. | |
| 7,382,121 B2 | * | 6/2008 | Shiraga ............... | B62D 15/0215 324/207.21 |
| 10,228,054 B1 | * | 3/2019 | Wittig ...................... | F16H 57/12 |
| 2009/0146650 A1 | * | 6/2009 | Hatanaka ................ | G01D 5/145 324/207.25 |
| 2009/0314114 A1 | * | 12/2009 | Grasberg ................ | F16H 55/24 74/409 |
| 2015/0251698 A1 | | 9/2015 | Schnieders et al. | |
| 2016/0209783 A1 | * | 7/2016 | Chino ................ | G03G 21/1647 |

(Continued)

FOREIGN PATENT DOCUMENTS

| | | |
|---|---|---|
| DE | 195 06 938 A1 | 8/1996 |
| DE | 10 2006 050 961 A1 | 4/2008 |

(Continued)

OTHER PUBLICATIONS

Jun. 4, 2020 Extended European Search Report issued in European Patent Application No. 20150517.9.

*Primary Examiner* — Octavia Hollington
(74) *Attorney, Agent, or Firm* — Oliff PLC (57) ABSTRACT

A sensor includes a main drive gear mounted on a shaft that is subjected to detection by the sensor such that the main drive gear is rotatable integrally with the shaft; at least one driven gear meshing with the main drive gear; a sensor housing accommodating the main drive gear and the at least one driven gear; a biasing member biasing the at least one driven gear toward the main drive gear; and a conversion mechanism configured to convert an axial force that is parallel to an axial direction of the shaft and acts on the at least one driven gear to a force in such a direction that the at least one driven gear is separated from the main drive gear when a part of the at least one driven gear contacts a part of the main drive gear while the shaft is inserted in the sensor housing.

7 Claims, 6 Drawing Sheets

(56) References Cited

U.S. PATENT DOCUMENTS

2018/0031431 A1    2/2018  Wang et al.
2020/0307694 A1*  10/2020  Toyama ................. G01D 5/145

FOREIGN PATENT DOCUMENTS

| DE | 10 2010 052 949 A1 |   | 5/2012 |
|----|---------------------|---|--------|
| DE | 10 2014 102 982 B3 |   | 3/2015 |
| EP | 3 470 808 A1       |   | 4/2019 |
| JP | H11-500828 A       |   | 1/1999 |
| JP | 2004084697         | * | 3/2004 |

* cited by examiner

SENSOR FOR SMOOTH ASSEMBLY

INCORPORATION BY REFERENCE

The disclosure of Japanese Patent Application No. 2019-001845 filed on Jan. 9, 2019 including the specification, drawings and abstract is incorporated herein by reference in its entirety.

BACKGROUND

1. Technical Field

The disclosure relates to a sensor.

2. Description of Related Art

With recent increased functionality of vehicles, various systems for improving driving stability such as a vehicle stability control system and an electronically controlled suspension system have been sometimes mounted on vehicles. These systems receive the steering angle of a steering wheel as part of vehicle attitude information and control the vehicle based on the attitude information to stabilize the attitude of the vehicle. A rotation angle sensor that detects the steering angle of the steering wheel is therefore mounted in, for example, a steering column of the vehicle.

For example, the rotation angle sensor of Japanese Unexamined Patent Application Publication (Translation of PCT Application) No. 11-500828 (JP 11-500828 A) includes a main drive gear that rotates together with a steering shaft and two driven gears meshing with the main drive gear. The number of teeth of one driven gear is different from the number of teeth of the other driven gear, and thus, the rotation angles of the two driven gears resulting from rotation of the main drive gear are different from each other. The rotation angle sensor detects the rotation angles of the two driven gears using sensors corresponding to the two driven gears and calculates the rotation angle of the steering shaft based on the detected rotation angles.

SUMMARY

The rotation angle sensor of JP 11-500828 A is assembled by inserting, in a housing supporting the two driven gears therein, the steering shaft on which the main drive gear is mounted. At this time, the teeth of the driven gears may interfere with the teeth of the main drive gear in the axial direction of the steering shaft depending on the rotational positions of the main drive gear and the two driven gears. Such interference may hinder assembly of the rotation angle sensor.

The disclosure provides a sensor that is smoothly assembled.

An aspect of the disclosure relates to a sensor including a main drive gear mounted on a shaft that is subjected to detection by the sensor such that the main drive gear is rotatable integrally with the shaft; at least one driven gear meshing with the main drive gear; a sensor housing accommodating the main drive gear and the at least one driven gear, the sensor being configured to detect a rotation angle of the shaft based on rotation of the at least one driven gear that rotates with the main drive gear, the at least one driven gear being supported in the sensor housing such that the at least one driven gear is rotatable and movable in a radial direction of the main drive gear, and the at least one driven gear being caused to mesh with the main drive gear by inserting, in the sensor housing, the shaft on which the main drive gear is mounted; a biasing member biasing the at least one driven gear toward the main drive gear; and a conversion mechanism configured to convert an axial force that is parallel to an axial direction of the shaft and acts on the at least one driven gear to a force in such a direction that the at least one driven gear is separated from the main drive gear when a part of the at least one driven gear contacts a part of the main drive gear while the shaft is inserted in the sensor housing.

When inserting, in the sensor housing supporting the driven gear therein, the shaft on which the main drive gear is mounted, a part of the driven gear may interfere with a part of the main drive gear in the axial direction of the shaft depending on the rotational position of the driven gear or the main drive gear. In this case, according to the above configuration, the conversion mechanism converts the axial force that is parallel to the axial direction of the shaft and acts on the driven gear to the force in such a direction that the driven gear is separated from the main drive gear. The driven gear is thus moved in a direction away from the main drive gear against the biasing force of the biasing member. Accordingly, the shaft can be further pushed in the sensor housing while avoiding interference between the part of the driven gear and the part of the main drive gear. When the shaft is inserted in the sensor housing to a predetermined position, the driven gear is moved toward the main drive gear by the biasing force of the biasing member, and thus, the driven gear meshes with the main drive gear. Since the operation of inserting the shaft in the sensor housing is thus not hindered by interference between the part of the driven gear and the part of the main drive gear, the sensor is smoothly assembled.

In the above sensor, two driven gears may be mounted as the at least one driven gear; each of the two driven gears may include a gear portion meshing with the main drive gear and a shaft portion supported by the sensor housing; and the biasing member may be a helical torsion spring including a coil portion supported in the sensor housing, a first arm biasing the shaft portion of one of the two driven gears toward the main drive gear, and a second arm biasing the shaft portion of the other of the two driven gears toward the main drive gear.

According to this configuration, the two driven gears are biased toward the main drive gear by the first and second arms of the helical torsion spring. Since only one helical torsion spring is provided, an increase in number of parts can be restrained.

In the above sensor, the conversion mechanism may be a tilted surface provided in a portion of at least one of i) the main drive gear and ii) each of the at least one driven gear, the portion facing a portion of the other of i) the main drive gear and ii) each of the at least one driven gear in the axial direction of the shaft when the shaft is inserted in the sensor housing. In other words, the tilted surface may be provided in the main drive gear or each of the at least one driven gear, or the tilted surfaces may be provided in the main drive gear and each of the at least one driven gear.

According to this configuration, since the tilted surface is simply provided in at least one of i) the main drive gear and ii) each of the at least one driven gear, the configuration is simplified.

In the above sensor, the conversion mechanism may be a tilted surface provided in a portion of at least one of i) the main drive gear and ii) each of the two driven gears, the portion facing a portion of the other of i) the main drive gear and ii) each of the two driven gears in the axial direction of the shaft when the shaft is inserted in the sensor housing. In other words, the tilted surface may be provided in the main drive gear or each of the two driven gears, or the tilted surfaces may be provided in the main drive gear and each of the two driven gears.

According to this configuration, since the tilted surface is simply provided in at least one of i) the main drive gear and ii) each of the two driven gears, the configuration is simplified.

In the above sensor, a torque sensor configured to detect torque acting on the shaft may be mounted in the sensor housing.

According to this configuration, not only the rotation angle of the shaft but also the torque acting on the shaft are detected by a single sensor.

In the above sensor, the shaft may be a pinion shaft meshing with a steered shaft that steers a steered wheel of a vehicle.

The sensor of the above aspect of the disclosure is smoothly assembled.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
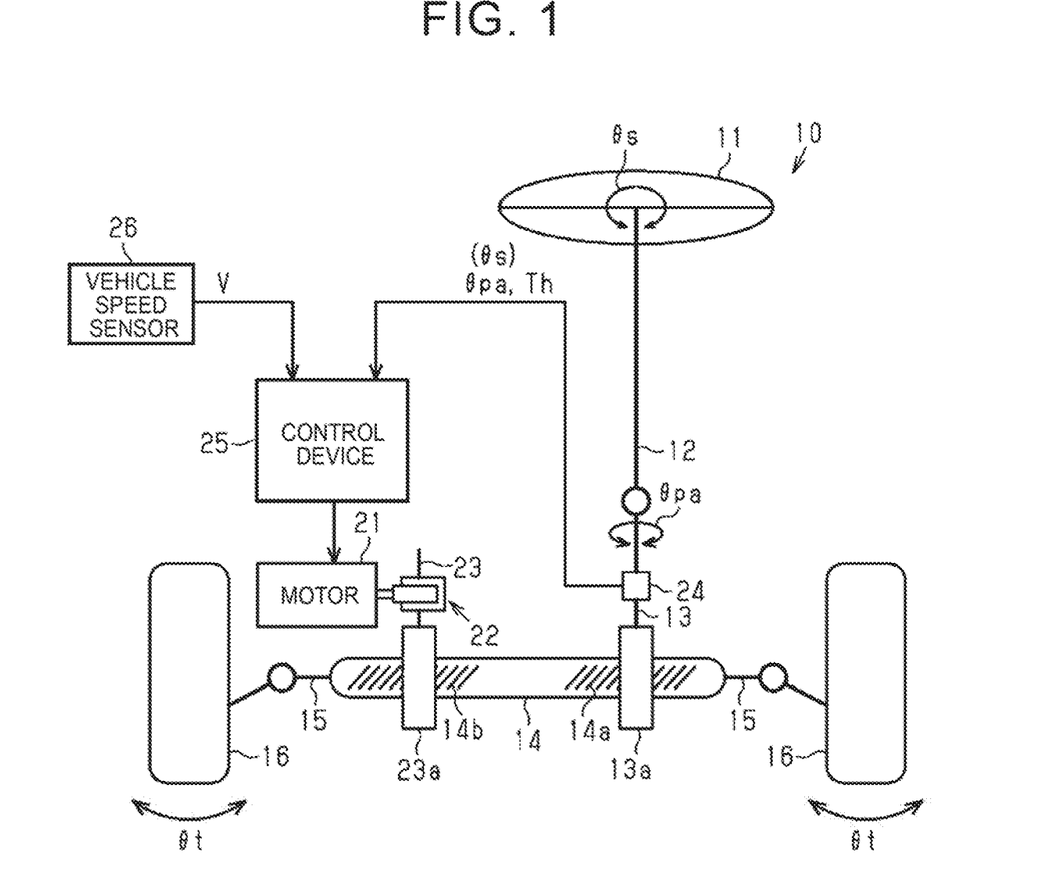
FIG. 1 is a configuration diagram of a steering device on which a sensor according to an embodiment is mounted.

An embodiment in which a sensor is applied to a steering device of a vehicle will be described. As shown in FIG. 1, a steering device 10 of a vehicle includes a steering shaft 12 connected to a steering wheel 11. A pinion shaft 13 is mounted at the opposite end of the steering shaft 12 from the steering wheel 11. A steered shaft 14 extends in a direction crossing the pinion shaft 13, and pinion teeth 13a of the pinion shaft 13 mesh with rack teeth 14a of the steered shaft 14. Right and left steered wheels 16 are connected to respective ends of the steered shaft 14 via tie rods 15.

The steering device 10 includes, as a configuration for generating a steering assist force (assist force), a motor 21, a speed reduction mechanism 22, a pinion shaft 23, a torque angle sensor (hereinafter referred to as the "TAS 24"), and a control device 25.

The motor 21 is a source of generation of the steering assist force, and for example, a three-phase brushless motor is used as the motor 21. The motor 21 is connected to the pinion shaft 23 via the speed reduction mechanism 22. Pinion teeth 23a of the pinion shaft 23 mesh with rack teeth 14b of the steered shaft 14. The rotational speed of the motor 21 is reduced by the speed reduction mechanism 22, and the resultant rotational force is transmitted as a steering assist force from the pinion shaft 23 to the pinion shaft 13 through the steered shaft 14.

The TAS 24 is mounted on the pinion shaft 13 (specifically, the TAS 24 is provided in a gear housing accommodating the steered shaft 14 and the pinion shaft 13). The TAS 24 includes a torque sensor and a rotation angle sensor that are combined with each other. The TAS 24 detects torque applied to the pinion shaft 13 by an operation of rotating the steering wheel 11, as steering torque Th. The TAS 24 also detects a rotation angle θpa of multiple rotations of the pinion shaft 13, which exceeds 360°, as a steering angle θs.

The control device 25 receives the steering torque Th and the steering angle θs that are both detected by the TAS 24. The control device 25 also receives a vehicle speed V detected by a vehicle speed sensor 26 mounted in the vehicle. The control device 25 performs assist control for generating a steering assist force (assist force) according to the steering torque Th and the vehicle speed V, through control of current applied to the motor 21. The control device 25 controls power supply (supply of electric power) to the motor 21 based on the steering torque Th detected by the TAS 24 and the vehicle speed V detected by the vehicle speed sensor 26.

Figure 2:
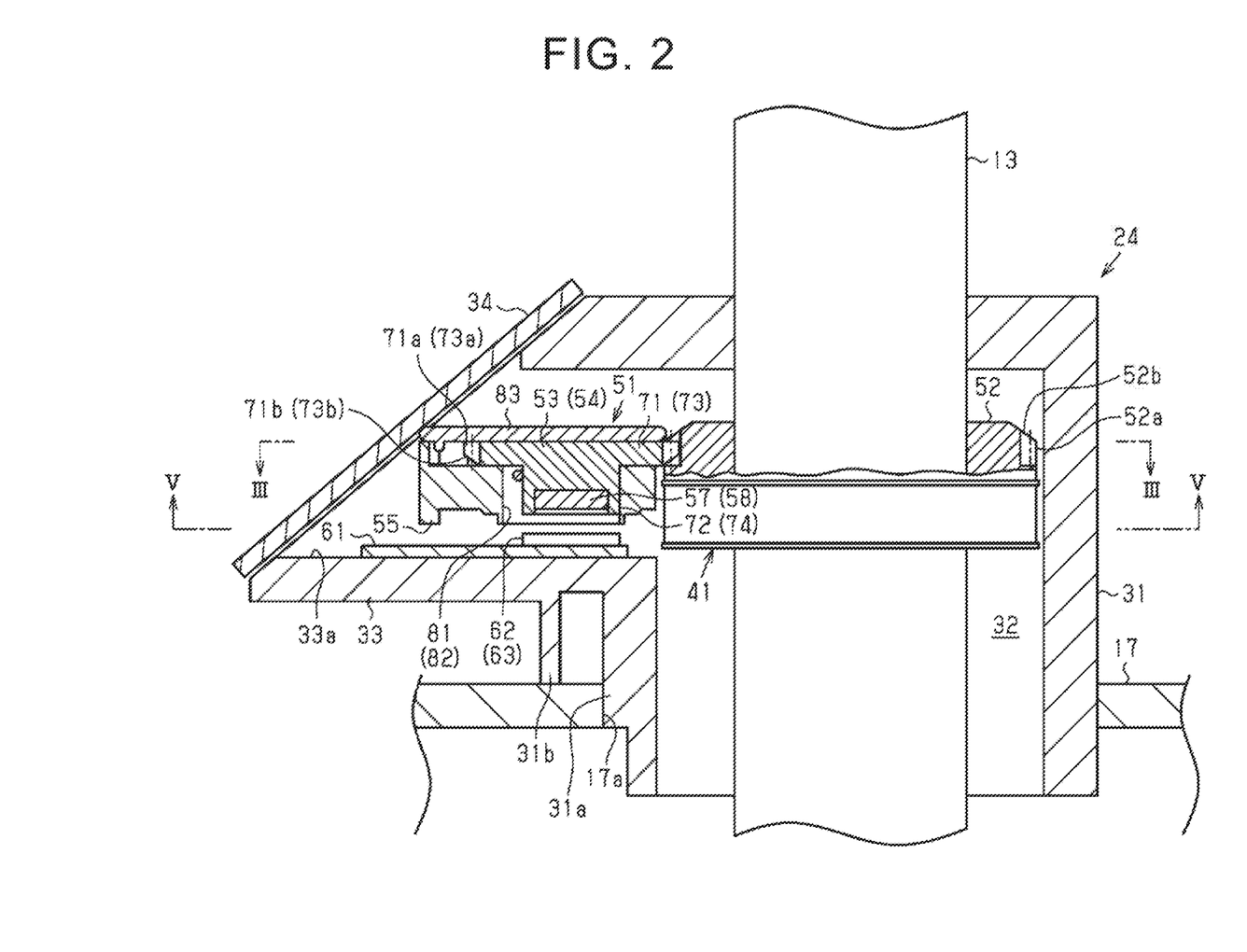
FIG. 2 is a sectional view of a torque angle sensor according to the embodiment taken in the axial direction of a pinion shaft.

Next, the configuration of the TAS 24 will be described. As shown in FIG. 2, the TAS 24 has a sensor housing 31. The sensor housing 31 is attached to a gear housing 17 accommodating the steered shaft 14. The sensor housing 31 has an insertion hole 32 and an accommodating chamber 33. The pinion shaft 13 is inserted in the insertion hole 32. Although not shown in the figure, the pinion shaft 13 includes an input shaft located on the side of the steering shaft 12, an output shaft located on the side of the steered shaft 14, and a torsion bar connecting the input shaft and the output shaft. The accommodating chamber 33 is in the shape of a box that is open in a direction crossing the axial direction of the pinion shaft 13. The accommodating chamber 33 communicates with the insertion hole 32 and is open to the outside of the sensor housing 31. An opening 33a of the accommodating chamber 33 is closed by a cover 34.

A torque sensor 41 and a rotation angle sensor 51 are mounted inside the sensor housing 31. Although not shown in the figure, the torque sensor 41 includes a permanent magnet, a magnetic yoke, a magnetism collecting ring, and a magnetic sensor. The permanent magnet is fixed to the input shaft of the pinion shaft 13. The magnetic yoke is fixed to the output shaft of the pinion shaft 13 and forms a magnetic circuit according to the magnetic field of the permanent magnet. The magnetism collecting ring is fixed in the sensor housing 31 and induces a magnetic flux from the magnetic yoke. The magnetic sensor detects a magnetic flux induced by the magnetism collecting ring.

When the torsion bar of the pinion shaft 13 is torsionally deformed by an operation of the steering wheel 11, the relative positions of the permanent magnet and the magnetic yoke in the rotation direction change accordingly. Thus, the density of the magnetic flux induced from the permanent magnet to the magnetism collecting ring through the magnetic yoke changes accordingly. The magnetic sensor generates an electrical signal according to the magnetic flux density. The control device 25 detects torque acting on the torsion bar as steering torque, based on the electric signal generated by the magnetic sensor.

Figure 3:
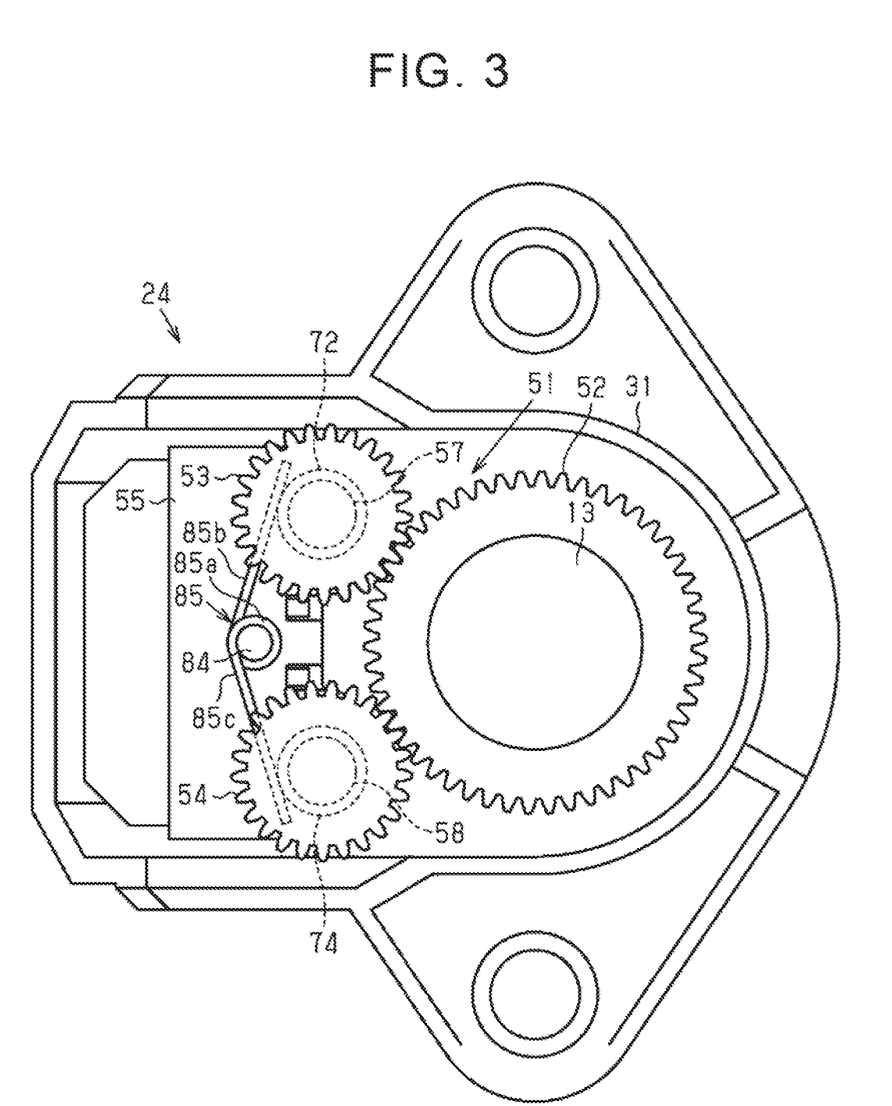
FIG. 3 is a sectional view taken along line III-III in FIG. 2.

As shown in FIG. 3, the rotation angle sensor 51 has a main drive gear 52 and two driven gears 53, 54. The main drive gear 52 is fitted on the input shaft of the pinion shaft 13 such that the main drive gear 52 is rotatable integrally with (i.e., together with) the input shaft of the pinion shaft 13. The two driven gears 53, 54 are rotatably supported through a support member 55, in the accommodating chamber 33 of the sensor housing 31. The two driven gears 53, 54 mesh with the main drive gear 52. Accordingly, when the pinion shaft 13 rotates, the main drive gear 52 also rotates together with the pinion shaft 13, and the two driven gears 53, 54 rotate accordingly. The number of teeth of the driven gear 53 is different from the number of teeth of the driven gear 54. Accordingly, when the main drive gear 52 rotates together with rotation of the pinion shaft 13, the rotation angles of the two driven gears 53, 54 with respect to the rotation angle of the main drive gear 52 are different from each other. Permanent magnets 57, 58 are mounted in the driven gears 53, 54, respectively, such that the permanent magnets 57, 58 are rotatable integrally with (i.e., together with) the driven gears 53, 54, respectively.

As shown in FIG. 2, a base plate 61 is mounted on the inner bottom surface of the accommodating chamber 33 of the sensor housing 31. Two magnetic sensors (only one is shown in FIG. 2) 62, 63 are mounted on a side surface of the base plate 61, which is located on the side of the driven gear 53, 54 (i.e., an upper surface of the base plate 61 in FIG. 2). The magnetic sensors 62, 63 face the permanent magnets 57, 58 (only one is shown in FIG. 2) in the axial direction of the insertion hole 32 of the sensor housing 31. Hall sensors or magnetoresistive (MR) sensors are used as the magnetic sensors 62, 63. The magnetic sensors 62, 63 generate electrical signals according to changes in magnetic fields that occur as the driven gears 53, 54 rotate. The control device 25 detects the rotation angle θpa of the pinion shaft 13 as the steering angle θs, based on the electrical signals generated by the magnetic sensors 62, 63. The magnetic sensor of the torque sensor 41 is also mounted on the base plate 61.

Figure 4:
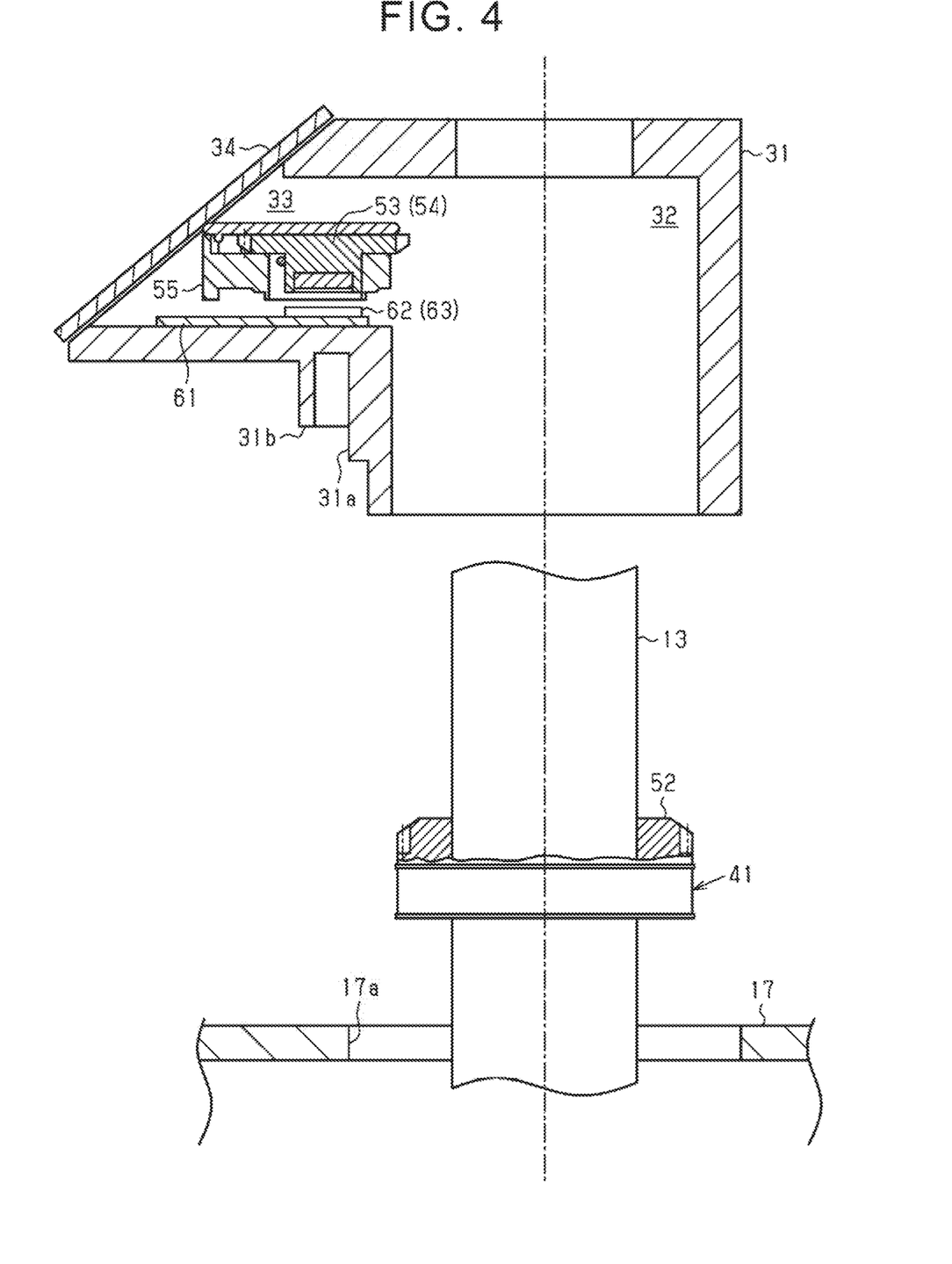
FIG. 4 is an exploded sectional view of the torque angle sensor according to the embodiment.

Next, a procedure of assembling the TAS will be described. As shown in FIG. 4, when the TAS 24 is attached to the gear housing 17, a subassembly (unit) of the TAS 24 is first assembled. The driven gears 53, 54, the base plate 61, and the magnetism collecting ring of the torque sensor 41 are mounted in the sensor housing 31 so that these components can be handled together as the subassembly. The main drive gear 52 is attached to the input shaft of the pinion shaft 13. The magnetic yoke of the torque sensor 41 is attached to the output shaft of the pinion shaft 13. In this state, the distal end of the pinion shaft 13 is inserted in the subassembly of the TAS 24.

When the distal end of the pinion shaft 13 is inserted in the subassembly of the TAS 24, the driven gears 53, 54 become closer to the main drive gear 52 in the axial direction of the pinion shaft 13. Eventually, a bottom portion 31a of the sensor housing 31 is fitted in an attachment hole 17a of the gear housing 17, and a stepped portion 31b formed in the peripheral edge portion of the bottom portion 31a of the sensor housing 31 contacts the peripheral edge portion defining the attachment hole 17a of the gear housing 17. The teeth of the driven gears 53, 54 mesh with the teeth of the main drive gear 52 at this timing. In this state, a bolt is inserted into a fastening portion of the sensor housing 31 and fastened to the gear housing 17 to fix the subassembly of the TAS 24 to the gear housing 17. Assembly of the TAS 24 is thus completed.

The following may occur when the TAS 24 is assembled. When the pinion shaft 13 is inserted in the subassembly of the TAS 24, the teeth of the two driven gears 53, 54 may interfere with the teeth of the main drive gear 52 in the axial direction of the pinion shaft 13 depending on the rotational positions of the main drive gear 52 and the driven gears 53, 54.

Figure 5:
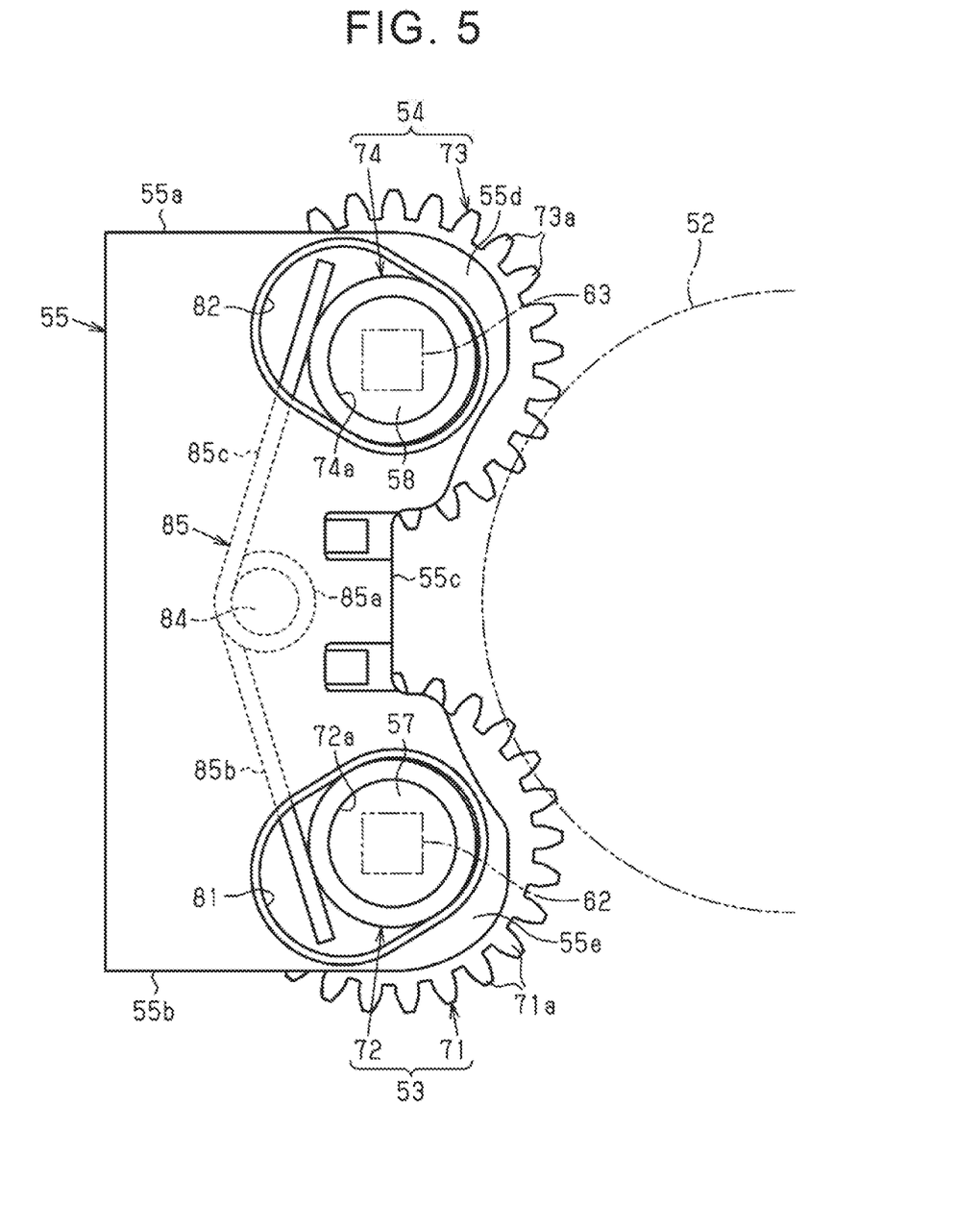
FIG. 5 is a sectional view of a main part taken along line V-V in FIG. 2.

Therefore, in the present embodiment, the following configuration is employed as a support structure for supporting the driven gears 53, 54 in the sensor housing 31. As shown in FIG. 5, the driven gear 53 includes a gear portion 71 having a circular plate shape and a magnet holding portion 72 having a columnar shape. The outside diameter of the magnet holding portion 72 is smaller than that of the gear portion 71. The magnet holding portion 72 is located in the center of a side surface of the gear portion 71. The side surface of the gear portion 71 is located on the side of the base plate 61 (i.e., the side surface is located on the viewer's side in FIG. 5). The driven gear 53 has a plurality of teeth 71a provided on an outer peripheral surface of the gear portion 71. The driven gear 53 also has a cylindrical holding hole 72a provided in a side surface of the magnet holding portion 72. The side surface of the magnet holding portion 72 is located on the side of the base plate 61. The permanent magnet 57 is fitted in the holding hole 72a. Like the driven gear 53, the driven gear 54 has a gear portion 73 and a magnet holding portion 74. The driven gear 54 has a plurality of teeth 73a provided on an outer peripheral surface of the gear portion 73. The driven gear 54 also has a holding hole 74a provided in a side surface of the magnet holding portion 74. The side surface of the magnet holding portion 74 is located on the side of the base plate 61. The permanent magnet 58 is fitted in the holding hole 74a.

As shown in FIG. 2, a tilted surface 71b is formed on an end of each tooth 71a of the driven gear 53, the end being located on the side of the base plate 61. In a view shown in FIG. 2, the tilted surface 71b of each tooth 71a is tilted such that a radial distance between the tilted surface 71b and a center of the driven gear 53 decreases in a direction toward the base plate 61. The driven gear 54 has a configuration similar to that of the driven gear 53. That is, as shown by reference characters in parentheses in FIG. 2, a tilted surface 73b is formed on the end of each tooth 73a of the driven gear 54, the end being located on the side of the base plate 61. In the view shown in FIG. 2, the tilted surface 73b of each tooth 73a is tilted such that a radial distance between the tilted surface 73b and a center of the driven gear 54 decreases in a direction toward the base plate 61. A tilted surface 52b is formed on the opposite end of each tooth 52a of the main drive gear 52 from the gear housing 17 (the upper end of each tooth 52a in FIG. 2). In the view shown in FIG. 2, the tilted surface 52b of each tooth 52a is tilted such that a radial distance between the tilted surface 52b and a center of the main drive gear 52 decreases in a direction toward a side opposite to the gear housing 17 (i.e., a direction away from the gear housing 17).

As shown in FIG. 5, the driven gears 53, 54 are rotatably supported through the support member 55 having a rectangular plate shape, in the sensor housing 31 (i.e., in the accommodating chamber 33). The support member 55 is mounted in the accommodating chamber 33 in such an attitude that the long side surfaces of the support member 55 extend along a tangent line to the main drive gear 52. The support member 55 has two support holes 81, 82. The support holes 81, 82 are formed in two corners 55d, 55e of the support member 55 where two short side surfaces 55a, 55b (the upper and lower surfaces in FIG. 5) of the support member 55 meet a long side surface 55c of the support member 55, which is located on the side of the main drive gear 52 (i.e., the right side surface of the support member 55 in FIG. 5). The support holes 81, 82 are long holes extending in the radial direction of the main drive gear 52. The support holes 81, 82 are formed such that the distance therebetween increases in a direction away from the main drive gear 52.

As shown in FIG. 2, the magnet holding portions 72, 74 of the driven gears 53, 54 are inserted in the support holes 81, 82. The magnet holding portions 72, 74 of the driven gears 53, 54 are inserted into the support holes 81, 82 of the support member 55 from the opposite side of the support member 55 from the base plate 61 (i.e., the magnet holding portions 72, 74 are inserted from the upper side in FIG. 2), instead of being inserted from the side where the base plate 61 is provided. Movement of the driven gears 53, 54 toward the base plate 61 is restricted when the gear portions 71, 73 of the driven gears 53, 54 contact the opposite side surface of the support member 55 from the base plate 61 (i.e., the upper surface of the support member 55 in FIG. 2). The distal ends of the magnet holding portions 72, 74 (the opposite ends of the magnet holding portions 72, 74 from the gear portions 71, 73) are thus kept facing the magnetic sensors 62, 63 mounted on the base plate 61.

The driven gears 53, 54 can slide and rotate (i.e., the driven gears 53, 54 are slidable and rotatable) with respect to the support member 55 via the gear portions 71, 73. The driven gears 53, 54 can move (i.e., the driven gears 53, 54 are movable) along the support holes 81, 82, respectively. Each of the driven gears 53, 54 moves between a first position and a second position. The first positions refers to the positions where the magnet holding portions 72, 74 engage with first ends (ends located closer to the main drive gear 52) of the support holes 81, 82, respectively. The second positions refers to the positions where the magnet holding portions 72, 74 engage with second ends (ends farther away from the main drive gear 52) of the support holes 81, 82, respectively.

A stopper 83 having a plate shape is disposed on the support member 55 from the opposite side of the support member 55 from the base plate 61. The stopper 83 covers the opposite side surfaces of the driven gears 53, 54 from the base plate 61 (the upper surfaces of the driven gears 53, 54 in FIG. 2). Movement of the driven gears 53, 54 toward the opposite side from the base plate 61 is restricted when the gear portions 71, 73 contacts the stopper 83. The driven gears 53, 54 can slide and rotate with respect to the stopper 83 via the gear portions 71, 73.

As shown in FIG. 3, a support portion 84 having a columnar shape is provided on the opposite side surface of the support member 55 from the base plate 61 (the side surface of the support member 55 that is located on the viewer's side in FIG. 3). The support portion 84 is located between the two support holes 81, 82 in the direction of the long side of the support member 55. A helical torsion spring 85 is attached to the support portion 84.

As shown in FIG. 5, the helical torsion spring 85 includes a coil portion 85a, a first arm 85b, and a second arm 85c. The support portion 84 is inserted into the coil portion 85a. The first arm 85b is engaged with the opposite part of the magnet holding portion 72 of the driven gear 53 from the main drive gear 52. The second arm 85c is engaged with the opposite part of the magnet holding portion 74 of the driven gear 54 from the main drive gear 52. Each of the driven gears 53, 54 is always biased toward the main drive gear 52 by the elastic force of the helical torsion spring 85. Movement of the driven gears 53, 54 toward the main drive gear 52 is restricted when the magnet holding portions 72, 74 engage with the first ends (the ends located closer to the main drive gear 52) of the support holes 81, 82.

Next, functions of the support structure for the driven gears 53, 54 will be described. When the pinion shaft 13 is inserted in the subassembly of the TAS 24, the teeth 52a of the main drive gear 52 smoothly enter the tooth spaces (spaces (grooves) between the teeth) of the driven gears 53, 54 in the axial direction of the pinion shaft 13 when the teeth 52a of the main drive gear 52 are located at the positions corresponding to the tooth spaces of the driven gears 53, 54 in the rotation direction of the main drive gear 52 and the driven gears 53, 54. In this case, the teeth 52a of the main drive gear 52 mesh with the teeth 71a, 73a of the driven gears 53, 54.

On the other hand, when inserting the pinion shaft 13 in the subassembly of the TAS 24, the following event occurs when the teeth 52a of the main drive gear 52 are not located at the positions corresponding to the tooth spaces of the driven gears 53, 54 in the rotation direction of the main drive gear 52 and the driven gears 53, 54.

Figure 6A:
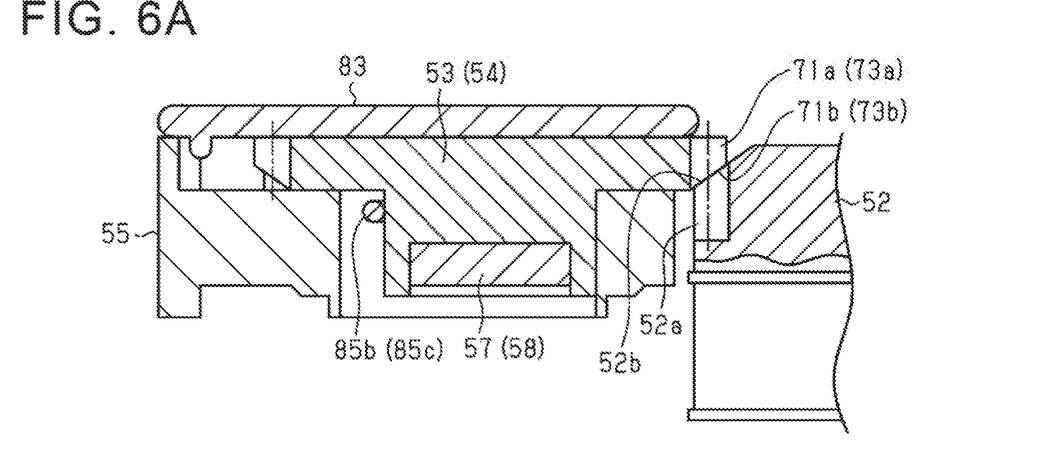
FIG. 6A is a sectional view of a main part illustrating a tooth of a main drive gear and a tooth of a driven gear interfering with each other in the axial direction during assembly of the torque angle sensor.

As shown in FIG. 6A, as the pinion shaft 13 is inserted in the subassembly of the TAS 24, the teeth 71a, 73a of the driven gears 53, 54 become closer to the teeth 52a of the main drive gear 52. The tilted surfaces 71b, 73b of the teeth 71a, 73a of the driven gears 53, 54 eventually contact the tilted surfaces 52b of the teeth 52a of the main drive gear 52 in the axial direction of the pinion shaft 13.

Figure 6B:
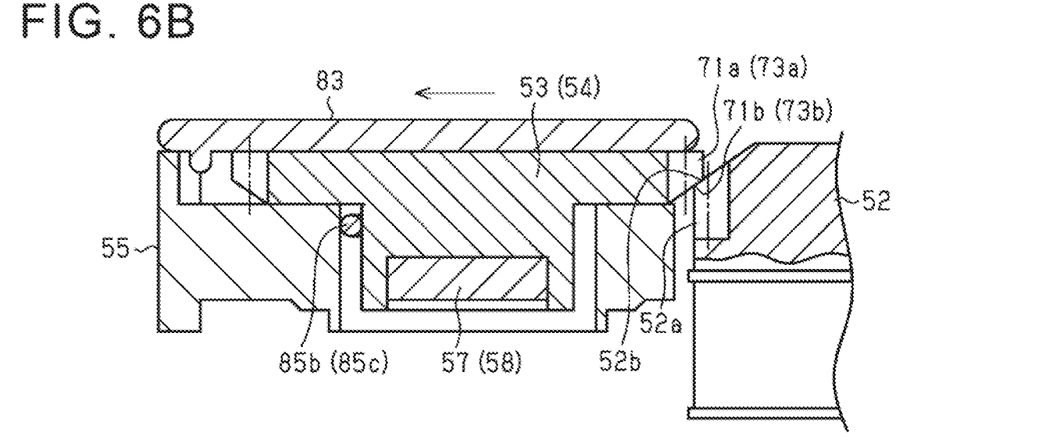
FIG. 6B is a sectional view of the main part illustrating the driven gear having been moved in a direction away from the main drive gear.

As shown in FIG. 6B, when the pinion shaft is further pushed in the subassembly of the TAS 24, a force in the axial direction of the pinion shaft 13 that acts on the driven gears 53, 54 (a force that tries to move the subassembly of the TAS 24 along the pinion shaft 13) is converted by engagement between the tilted surfaces 71b, 73b of the teeth 71a, 73a and the tilted surfaces 52b of the teeth 52a to a force in such a direction that the driven gears 53, 54 are separated from the main drive gear 52. This is because the pinion shaft 13 supported by the gear housing 17 and the main drive gear 52 cannot move in the radial direction. Accordingly, the tilted surfaces 71b, 73b of the teeth 71a, 73a are guided laterally from the main drive gear 52 by the tilted surfaces 52b of the teeth 52a, and the driven gears 53, 54 are moved in a direction away from the main drive gear 52 against the elastic force of the helical torsion spring 85.

After the driven gears 53, 54 are moved in the direction away from the main drive gear 52 to such positions that the tilted surfaces 71b, 73b of the driven gears 53, 54 are disengaged from the tilted surfaces 52b of the main drive gear 52, the driven gears 53, 54 are relatively moved in the direction in which the subassembly of the TAS 24 is moved relative to the pinion shaft 13 (downward in FIG. 6B) as the pinion shaft 13 is further inserted in the subassembly of the TAS 24. The driven gears 53, 54 are eventually relatively moved to such positions that the teeth 71a, 73a of the driven gears 53, 54 are located at the same position as that of the teeth 52a of the main drive gear 52 in in the radial direction, or the teeth 71a, 73a of the driven gears 53, 54 face the teeth 52a of the main drive gear 52 in in the radial direction. Even during this movement, the driven gears 53, 54 are biased toward the main drive gear 52 by the elastic force of the helical torsion spring 85. Accordingly, when the teeth 71a, 73a of the driven gears 53, 54 are not located at the positions corresponding to the tooth spaces of the main drive gear 52, the teeth 71a, 73a of the driven gears 53, 54 slide with respect to (contact) the teeth 52a of the main drive gear 52. When the rotational positions of the driven gears 53, 54 change during this process and the teeth 71a, 73a of the driven gears 53, 54 are located at the positions corresponding to the tooth spaces of the main drive gear 52, the driven gears 53, 54 are moved toward the main drive gear 52 by the elastic force of the helical torsion spring 85.

Figure 6C:
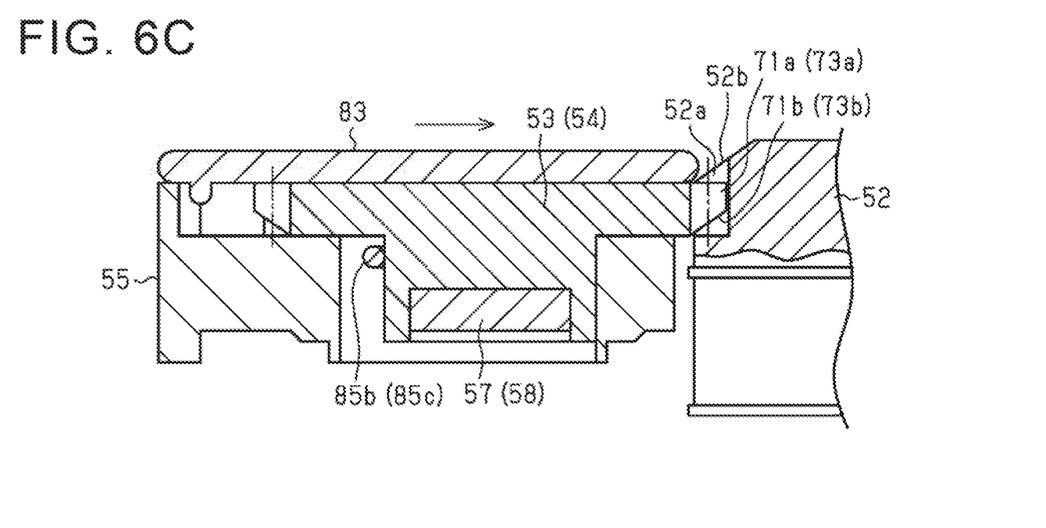
FIG. 6C is a sectional view of the main part illustrating the tooth of the driven gear meshing with the tooth of the main drive gear.

As shown in FIG. 6C, the teeth 71a, 73a of the driven gears 53, 54 thus enter the tooth spaces of the main drive gear 52 in the radial direction, and thus, the teeth 71a, 73a of the driven gears 53, 54 mesh with the teeth 52a of the main drive gear 52 in the rotation direction.

As described above, even when the teeth of the driven gears 53, 54 interfere with the teeth of the main drive gear 52 in the axial direction of the pinion shaft 13 while the pinion shaft 13 is inserted in the subassembly of the TAS 24, the subassembly of the TAS 24 can be attached to the gear housing 17 in an appropriate manner, namely with the driven gears 53, 54 meshing with the main drive gear 52, by simply inserting the pinion shaft 13 in the subassembly of the TAS 24. There is no need to perform, for example, adjustment of the rotational positions of the driven gears 53, 54 while inserting the pinion shaft 13 in the subassembly of the TAS 24.

Effects of the present embodiment will be described. According to the present embodiment, the following effects can be obtained. (1) When the teeth of the driven gears 53, 54 interfere with the teeth of the main drive gear 52 in the axial direction of the pinion shaft 13 while the pinion shaft 13 is inserted in the subassembly of the TAS 24, the driven gears 53, 54 are moved in the direction away from the main drive gear 52 by engagement between the tilted surfaces 71b, 73b of the driven gears 53, 54 and the tilted surfaces 52b of the main drive gear 52. With this configuration, the pinion shaft 13 can be further pushed in the subassembly of the TAS 24 while restraining damage to the teeth 52a of the main drive gear 52 or the teeth 71a, 73a of the driven gears 53, 54. When the pinion shaft 13 is inserted in the subassembly of the TAS 24 to such a position that the teeth 71a, 73a of the driven gears 53, 54 are located at the positions corresponding to the tooth spaces (spaces between the teeth 52a) of the main drive gear 52, the driven gears 53, 54 are moved toward the main drive gear 52 by the elastic force of the helical torsion spring 85. The teeth 71a, 73a of the driven gears 53, 54 thus mesh with the teeth 52a of the main drive gear 52. Since assembly of the TAS 24 (the operation of inserting the pinion shaft 13 in the subassembly of the TAS 24) is not hindered by interference between the teeth of the driven gears 53, 54 and the teeth of the main drive gear 52, the TAS 24 is smoothly assembled.

(2) When the driven gears 53, 54 interfere with the main drive gear 52 in the axial direction of the pinion shaft 13 during assembly of the TAS 24, the force in the axial direction of the pinion shaft 13 that acts on the driven gears 53, 54 (the axial force parallel to the axial direction of the pinion shaft 13) is converted by engagement between the tilted surfaces 71b, 73b of the driven gears 53, 54 and the tilted surfaces 52b of the main drive gear 52 to the force in such a direction that the driven gears 53, 54 are separated from the main drive gear 52. Since the tilted surfaces 71b, 73b are simply formed in the driven gears 53, 54 and the tilted surfaces 52b are simply formed in the main drive gear 52, the configurations of the driven gears 53, 54 and the main drive gear 52 are simplified and the configuration of the TAS 24 is therefore simplified.

(3) The two driven gears 53, 54 are always biased toward the main drive gear 52 by the first arm 85b and the second arm 85c of the helical torsion spring 85. Since only one helical torsion spring 85 is provided, an increase in number of parts of the TAS 24 is restrained.

(4) The torque sensor 41 and the rotation angle sensor 51 are mounted in the sensor housing 31. Accordingly, not only the rotation angle of the pinion shaft 13 but also the torque acting on the pinion shaft 13 can be detected by a single sensor (TAS 24).

(5) The rotation angle sensor 51 of the TAS 24 detects the rotation angle of the main drive gear 52 by detecting the rotation of the two driven gears 53, 54 meshing with the main drive gear 52. Accordingly, especially when the main drive gear 52 starts rotating or when the rotation direction of the main drive gear 52 is reversed, looseness due to backlashes at two locations, namely the backlash between the main drive gear 52 and the driven gear 53 and the backlash between the main drive gear 52 and the driven gear 54, may affect calculation accuracy of the rotation angle of the main drive gear 52. In this regard, according to the present embodiment, the driven gears 53, 54 are kept pressed against the main drive gear 52 by the elastic force of the helical torsion spring 85 in the assembled TAS 24. The backlashes between the teeth 71a, 73a of the driven gears 53, 54 and the teeth 52a of the main drive gear 52 are therefore further reduced. As looseness due to the backlashes is thus reduced, the calculation accuracy of the rotation angle of the main drive gear 52 is improved.

The present embodiment may be modified as follows. The main drive gear 52 may not have the tilted surfaces 52b, or the driven gears 53, 54 may not have the tilted surfaces 71b, 73b. At least either the main drive gear 52 or the driven gears 53, 54 need have tilted surfaces. In such a configuration as well, when the teeth 71a, 73a of the driven gears 53, 54 interfere with the teeth 52a of the main drive gear 52 in the axial direction of the pinion shaft 13 during assembly of the TAS 24, the force in the axial direction of the pinion shaft 13 that acts on the driven gears 53, 54 can be converted to the force in such a direction that the driven gears 53, 54 are separated from the main drive gear 52.

The main drive gear 52 may have arc-shaped curved surfaces instead of the tilted surfaces 52b. The driven gears 53, 54 may have arc-shaped curved surfaces instead of the tilted surfaces 71b, 73b. In such a configuration as well, when the teeth 71a, 73a of the driven gears 53, 54 interfere with the teeth 52a of the main drive gear 52 in the axial direction of the pinion shaft 13 during assembly of the TAS 24, the force in the axial direction of the pinion shaft 13 that acts on the driven gears 53, 54 can be converted to the force in such a direction that the driven gears 53, 54 are separated from the main drive gear 52.

In the above embodiment, the TAS 24 is described as an example of the sensor. However, the sensor may be a simple rotation angle sensor 51, namely the TAS 24 in which the torque sensor 41 is omitted. This simple rotation angle sensor 51 solves a problem similar to that solved by the TAS 24.

A configuration having a single driven gear 53 or 54 may be used as the TAS 24 or the simple rotation angle sensor. A configuration having three or more driven gears may be used as the TAS 24 or the simple rotation angle sensor.

In the above embodiment, a device, on which the TAS 24 or the simple rotation angle sensor is mounted, is a steering device of a vehicle. However, the disclosure may be applied to other vehicular on-board devices having a shaft (rotary shaft). The TAS 24 or the simple rotation angle sensor is not limited to the TAS 24 mounted in a vehicle or the simple rotation angel sensor mounted in a vehicle.

What is claimed is:

1. A sensor comprising:
   a main drive gear mounted on a shaft that is subjected to detection by the sensor such that the main drive gear is rotatable integrally with the shaft;
   at least one driven gear meshing with the main drive gear, with a rotational axis of the main drive gear being parallel to a rotational axis of the at least one driven gear;
   a sensor housing accommodating the main drive gear and the at least one driven gear, the sensor being configured to detect a rotation angle of the shaft based on rotation of the at least one driven gear that rotates with the main drive gear, the at least one driven gear being supported in the sensor housing such that the at least one driven gear is rotatable and movable in a radial direction of the main drive gear, and the at least one driven gear being caused to mesh with the main drive gear by inserting, in the sensor housing, the shaft on which the main drive gear is mounted;
   a biasing member biasing the at least one driven gear toward the main drive gear; and
   a conversion mechanism configured to convert an axial force that is parallel to an axial direction of the shaft and acts on the at least one driven gear to a force in such a direction that the at least one driven gear is separated from the main drive gear when a part of the at least one driven gear contacts a part of the main drive gear while the shaft is inserted in the sensor housing, wherein
   the conversion mechanism is a tilted surface that faces upward or downward along the axial direction of the shaft.

2. The sensor according to claim 1, wherein:
   two driven gears are mounted as the at least one driven gear;
   each of the two driven gears includes a gear portion meshing with the main drive gear and a shaft portion supported by the sensor housing; and
   the biasing member is a helical torsion spring including a coil portion supported in the sensor housing, a first arm biasing the shaft portion of one of the two driven gears toward the main drive gear, and a second arm biasing the shaft portion of the other of the two driven gears toward the main drive gear.

3. The sensor according to claim 2, wherein the tilted surface is provided in a portion of at least one of i) the main drive gear and ii) each of the two driven gears, the tilted surface facing and coming into contact with a portion of the other of i) the main drive gear and ii) each of the two driven gears in the axial direction of the shaft when the shaft is inserted in the sensor housing.

4. The sensor according to claim 1, wherein the tilted surface is provided in a portion of at least one of i) the main drive gear and ii) each of the at least one driven gear, the tilted surface facing and coming into contact with a portion of the other of i) the main drive gear and ii) each of the at least one driven gear in the axial direction of the shaft when the shaft is inserted in the sensor housing.

5. The sensor according to claim 1, wherein a torque sensor configured to detect torque acting on the shaft is mounted in the sensor housing.

6. The sensor according to claim 1, wherein the shaft is a pinion shaft meshing with a steered shaft that steers steered wheels of a vehicle.

7. The sensor according to claim 1, wherein:
   the tilted surface is provided in both the main drive gear and the at least one driven gear,
   the tilted surface in the at least one driven gear is configured such that a radial distance between the titled surface and a center of the at least one driven gear decreases toward downward in the axial direction of the shaft, and
   the tilted surface in the main drive gear is configured such that a radial distance between the titled surface and a center of the main drive gear decreases toward upward in the axial direction of the shaft.

* * * * *